United States Patent [19]
David et al.

[11] 3,929,870
[45] Dec. 30, 1975

[54] EMULSIFIERS DERIVED FROM HYDROXYCARBOXYLIC ACIDS

[75] Inventors: Reginald David, Lyon; Jean Estienne, Ternay, both of France

[73] Assignee: Rhone-Poulenc, S.A., Paris, France

[22] Filed: May 28, 1974

[21] Appl. No.: 473,828

[30] Foreign Application Priority Data
May 30, 1973 France .............. 73.19733

[52] U.S. Cl............ 260/484 A; 260/484 R; 426/202
[51] Int. Cl.²........................................ C07C 69/68
[58] Field of Search................................ 260/484 A

[56] References Cited
UNITED STATES PATENTS
2,813,892  11/1957  Mehltretter...................... 260/484 A
3,846,479  11/1974  Zech............................... 260/484 A

*Primary Examiner*—Lorraine A. Weinberger
*Assistant Examiner*—Paul J. Killos
*Attorney, Agent, or Firm*—Stevens, Davis, Miller & Mosher

[57] ABSTRACT

Emulsifiers are made by esterifying one or two of the carboxyl groups of citric acid with a hydroxy-ester formed from a long chain alcohol and an acid of formula:

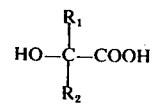

in which $R_1$ and $R_2$ are each hydrogen or methyl.

11 Claims, No Drawings

EMULSIFIERS DERIVED FROM HYDROXYCARBOXYLIC ACIDS

The present invention relates to esters of hydroxycarboxylic acids useful as emulsifiers.

The present invention provides new emulsifiers derived from citric acid, a hydroxycarboxylic acid of formula:

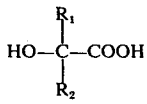

in which each of $R_1$ and $R_2$ is hydrogen or methyl, e.g. lactic acid, and an alcohol of formula ROH in which R is a saturated or unsaturated aliphatic radical of 12 to 22 carbon atoms.

Citric acid has the formula $$HOCO-CH_2-C(OH)-CH_2-COOH$$
$$|$$
$$COOH$$

and forms, with alcohols, mono-, di- and tri-esters. Lactic acid has the formula $CH_3 - CHOH - COOH$, and is capable of forming esters with both acids and alcohols, including an ester with itself, called lactyl lactic acid having the formula:

$$CH_3 - CHOH - COO - CH(CH_3) - COOH.$$

The citric acid esters of the invention have the formula:

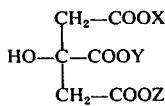 (I)

in which each of X, Y and Z represents:
a. hydrogen, alkali metal, or ammonium; or
b. a radical of formula:

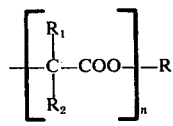

in which n is 1 to 2, $R_1$ and $R_2$, which may be identical or different, are each hydrogen or methyl, and R is a saturated or unsaturated aliphatic radical of 12 to 22 carbon atoms, one to two of X, Y and Z conforming to definition (a), and the remainder conforming to definition (b).

These esters possess valuable surface-active properties and can, because of this, be used as emulsifiers or dispersing agents in, for example, the foodstuffs industry, the dairy industry, the confectionery industry, and in cosmetology. They are suitable for preparing stable emulsions of the oil-in-water or water-in-oil types. They can thus be used in the preparation of sauces, mayonnaises and other compositions rich in fatty constituents. They are also useful in the preparation of animal feedstuffs, such as, for example, milks into which fatty constituents such as animal fat or some other edible fatty constituent have been reintroduced. They improve the wettability of various ingredients employed in aqueous media, for example powdered milks, dehydrated vegetables, and powdered eggs.

The esters of formula I are prepared, in accordance with the invention, by esterifying a hydroxy-carboxylic acid of the formula:

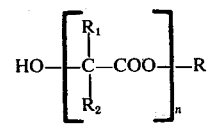

in which n, R, $R_1$ and $R_2$ are as hereinbefore defined with citric acid in a molar ratio of substantially 1:1 to 2:1.

The hydroxycarboxylic acids used in making the new emulsifiers are acids such as glycollic acid, lactic acid and α-hydroxyisobutyric acid. Lactic acid and lactyl-lactic acid are very particularly suitable because of their accessibility. With fatty alcohols, they form alkyl lactates and lactyl-lactates which can themselves be esterified by a carboxylic acid. In the present case, when citric acid is reacted with, for example, an alkyl lactate, it is possible to produce essentially only citrate monoesters or only citrate diesters depending on the method used, which is described below. These esters have the respective formulae:

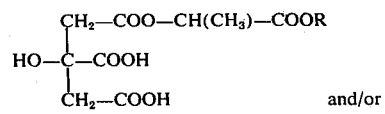

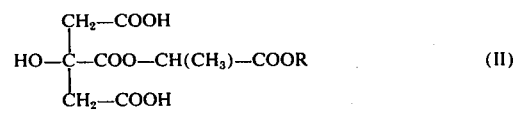 (II)

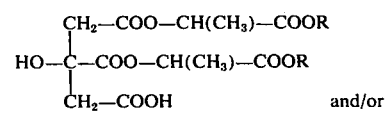

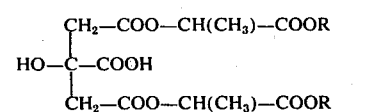 (III)

In order to produce preferentially the monoesters of the formula II, it is necessary to react citric acid with the alkyl lactate in substantially equimolecular amounts, while in order to produce the diesters of the formula III, twice as much alkyl lactate as citric acid, in mols, is used. It is possible to use larger amounts of alkyl lactate, but this is not desirable because a large amount of the triester then forms, which does not possess as good surface-active properties as those of the monoesters or diesters.

The alcohol of formula ROH may be, e.g., dodecyl alcohol, cetyl alcohol, stearyl alcohol, oleyl alcohol or an other alcohol which originates, for example, from the saponification of natural fatty materials. The lactates of these alcohols are known, and can be obtained by heating substantially equimolecular amounts of lactic acid with the alcohol, removing the water as it is formed. It is also possible to use esters of such alcohols with lactyl lactic acid, which are also known compounds obtained by reacting lactic acid and the alcohol ROH in a molar ratio of 2 : 1.

The esters of the formula II are prepared by heating citric acid with the alkyl lactate or other esters of formula:

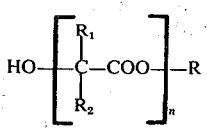

in a molar ratio of lactate (or other ester) to acid of 0.8 : 1 to 1.2 : 1, and preferably 1 : 1. The reaction is preferably carried out at 100°–170°C, and especially at 140°–160°C, under a reduced pressure of nitrogen or some other inert gas. During this heating, the water of crystallisation of citric acid (in the case where a commercial crystalline product is employed) and the water resulting from the esterification are removed. The reaction is usually carried out without a diluent, but an inert diluent may be used if desired.

The esters of the formula III are prepared under the same conditions, but the molar ratio of lactate (or other ester) to acid is from 1.8 : 1 to 2.2 : 1, and preferably 2 : 1. In both cases, it is the molar ratio of the reagents employed which essentially determines whether monoesters or diesters are formed preponderantly.

In an alternative method, the citric acid, lactic acid or other hydroxy carboxylic acid, and the alcohol are reacted together simultaneously in a molar ratio suitable for producing the desired ester. The reaction is carried out under the same working conditions as those indicated above for the reaction of citric acid with the alkyl hydroxy carboxylate. By this one-stage process, products with a high citrate monoester or diester content are obtained.

Whichever preparation method is used, the products obtained are odourless waxes which melt at temperatures of the order of 30° to 55°C and are soluble in the usual solvents such as ketones, like acetone and methyl ethyl ketone, alcohols, e.g. ethanol, benzene, petroleum ether and ethyl ether. They are miscible with fatty materials. Because of the acidity imparted to them by the presence of the non-esterified acid groups, they can form salts. Thus with alkaline reagents such as sodium hydroxide, potassium hydroxide, ammonia solutions and alkali metal carbonates and bicarbonates, they form salts which are solids which are soluble in water and which also possess emulsifying properties. Such salts are preferably made in a dilute medium and under cold conditions in order to prevent saponification of the citrate ester. An advantageous process for the preparation of these salts consists of reacting an aqueous solution of the alkaline reagent with the citric acid ester dissolved in a water-miscible solvent. The salt formed precipitates and may then be isolated from the aqueous-organic phase by any known means.

The following examples illustrate the invention.

EXAMPLE 1 a. 52 g of commercial lactic acid containing 88% of pure acid (0.5 mol) and 135 g of octadecanol (0.5 mol) are introduced into a 250 cm³ three-necked flask equipped with a central stirrer, a nitrogen inlet and a reflux condenser. Using a thermostatically controlled oil bath, the temperature of the mixture is raised gradually over the course of 1 hour 15 minutes to 200°C, and held at this temperature for 1 hour 30 minutes. The reaction mixture is then allowed to cool to 110°C and poured onto a borosilicate glass plate where it cools to ambient temperature. 170.25 g of octadecyl lactate are thus obtained as a creamy-white waxy product, m.p. 38°–40°C (KOFLER). This product has the formula

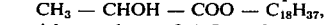

an acid number of 4.5 and an ester number of 157.5.

b. 102.6 g (0.3 mol) of octadecyl lactate are introduced into an identical apparatus and are heated to 60°C over the course of 15 minutes. 63 g (0.3 mol) of citric acid monohydrate crystals are then added and the apparatus is purged with nitrogen. The temperature is raised to 156°C over the course of 40 minutes while the apparatus is gradually evacuated to 50 mm Hg. Heating is continued, with vigorous stirring, for 1 hour 40 minutes, to maintain the temperature at 155°–160°C, the mixture is then allowed to cool to 100°C, and the vacuum is broken. The homogeneous reaction mixture, of orange-yellow colour, is poured onto a borosilicate glass plate and left to stand at ambient temperature. 144.2 g of a yellow waxy product, m.p. 48°–50°C (KOFLER), are thus obtained. It has an acid number of 204 and an ester number of 218. It consists essentially of the octadecyl lactate citrate.

c. 55 g (0.1 mol) of the citrate ester are introduced into a 600 cm³ beaker equipped with an anchor stirrer, and are dissolved in 183 cm³ of acetone by heating at 30°C. The solution is then cooled to 20°C and, while stirring vigorously, 200 cm³ of N aqueous sodium hydroxide solution are run in, while the temperature is kept at 20°–25°C by an ice bath. A precipitate forms and the mixture is cooled to 5°C for 30 minutes. The precipitate is filtered off, drained and then dried to constant weight in an oven at 30°C, under the vacuum provided by a water pump. 51.7 g of a yellow solid product with an acid number of 21 and an ester number of 179, which is the disodium salt of octadecyl lactate citrate, are thus obtained.

By treating 55 g of the citrate ester obtained in (b) with 100 cm³ of N aqueous sodium hydroxide solution, in the same way, the corresponding monosodium salt, which has an acid number of 137 and an ester number of 158, is obtained.

EXAMPLE 2

Following the procedure of Example 1, 102.3 g of 88% pure lactic acid (1 mol) are reacted with 242.5 g of hexadecanol (1 mol), and 310.5 g of hexadecyl lactate with an acid number of 5 and an ester number of 166 are obtained.

110 g (0.35 mol) of hexadecyl lactate are then reacted, under the conditions described in Example 1 (b), with 73.5 g (0.35 mol) of citric acid monohydrate. 153.5 g of an orange-yellow waxy product, m.p. 38°–40°C (KOFLER), with an acid number of 187 and an ester number of 233, are obtained. This product consists essentially of hexadecyl lactate citrate.

By treating this product with N aqueous sodium hydroxide solution in accordance with the conditions of Example 1 (c), the corresponding monosodium and disodium salts are prepared, which have respectively acid numbers of 61 and 18 and ester numbers of 224 and 201.

EXAMPLE 3

164 g of 88% pure lactic acid (1.6 mols) are reacted, under the conditions of Example 1 (a), with 216 g (0.8 mol) of octadecanol, and 325 g of octadecyl lactyl-lactate of the formula $$CH_3 - CHOH - COO - CH(CH_3) - COO - C_{18}H_{37}$$

are obtained.

124 g of this product (0.3 mol) are then reacted under the conditions of Example 1 (b) with 63 g (0.3 mol) of citric acid monohydrate. A yellow wax which melts at 42°–45°C, has an acid number of 168 and an ester number of 286, and consists essentially of octadecyl lactyl-lactate citrate, is thus obtained.

Treatment of this wax with an aqueous solution of sodium hydroxide yields the monosodium and disodium salts, the acid numbers of which are respectively 94 and 51 and the ester numbers of which are respectively 238 and 216.

EXAMPLES 4 to 7

Working under the conditions of the preceding Examples, 0.15 mol of citric acid is reacted with 0.3 mol of each of the lactate esters prepared above, namely: hexadecyl lactate, hexadecyl lactyl-lactate, octadecyl lactate and octadecyl lactyl-lactate. The four products given in the table below are thus obtained. Salification of these products with N aqueous sodium hydroxide solution gives their sodium salts.

| Ex | | Acid number | Ester number |
|---|---|---|---|
| 4 | Bis(hexadecyl lactate)citrate | 72 | 248 |
|   | sodium salt | 23 | 211 |
| 5 | Bis(hexadecyl lactyl-lactate) citrate | 56 | 305 |
|   | sodium salt | 25 | 242 |
| 6 | Bis(octadecyl lactate)citrate | 71 | 235 |
|   | sodium salt | 21 | 201 |
| 7 | Bis(octadecyl lactyl-lactate) citrate | 62 | 305 |
|   | sodium salt | 42 | 241 |

EXAMPLES 8 to 15

These Examples illustrate the one-stage preparation of the citrate esters. The preparation is carried out under the conditions of Example 1 (b), by heating directly citric acid, lactic acid and hexadecanol or octadecanol, in molar ratios chosen according to the ester desired. The temperature is kept at 150°– 160°C for approximately 2 hours 20 minutes. The esters obtained are salified with an aqueous solution of sodium hydroxide under the conditions of Example 1 (c).

The table below gives the various products obtained, their acid and ester numbers, and the molar ratio of the starting materials in the order, citric acid, lactic acid, and hexadecanol or octadecanol.

| Ex | Molar ratio | | Acid number | Ester number |
|---|---|---|---|---|
| 8 | 1:1:1 | hexadecyl lactate citrate | 197 | 232 |
|   |       | sodium salt | 16 | 189 |
| 9 | 1:1:1 | octadecyl lactate citrate | 187 | 235 |
|   |       | disodium salt | 16 | 191 |
| 10 | 1:2:1 | hexadecyl lactyl-lactate citrate | 210 | 268 |
| 11 |       | octadecyl lactyl-lactate citrate | 202 | 265 |
| 12 |       | Bis(hexadecyl lactate) citrate | 71 | 247 |
|    |       | sodium salt | 26 | 211 |
| 13 | 1:2:2 | Bis(octadecyl lactate) citrate | 74 | 244 |
|    |       | sodium salt | 23 | 206 |
| 14 | 1:4:2 | Bis(hexadecyl lactyl-lactate)citrate | 63 | 318 |
|    |       | sodium salt | 23 | 271 |
| 15 | 1:4:2 | Bis(octadecyl lactyl-lactate) citrate | 71 | 304 |
|    |       | sodium salt | 29 | 252 |

EXAMPLE 16

This Example illustrates the emulsifying power of the new compounds by the following test: 100 g of refined suet (or some other fatty material) at 60°C are introduced into a 400 cm³ beaker, 3 g of the product to be tested are dissolved therein, and 150 cm³ of water at 60°C are then added. This mixture is stirred for 30 seconds with a propeller mixer and then transferred immediately to a 250 cm³ graduated cylinder, kept at 60°C. The stability of the emulsion is evaluated by measuring the volume of water which has separated out after various time intervals.

The results obtained are given in the following table, wherein the percentage of water which has separated out, expressed as volume of water which has separated out/volume of water introduced × 100, is shown after 15 minutes, 30 minutes and 1 hour.

| | 15 mins. | 30 mins. | 1 hr. |
|---|---|---|---|
| hexadecyl lactate citrate prepared in 2 stages | 0 | 0 | 0 |
| hexadecyl lactate citrate prepared in 1 stage | 0 | 0 | 0 |
| hexadecyl lactyl-lactate citrate | 0 | 0 | 0 |
| sodium salt of Bis(hexadecyl lactate)citrate | 0 | 0 | 1 |
| octadecyl lactate citrate | 0 | 0 | 0 |
| monosodium salt | 0 | 0 | 0 |
| octadecyl lactyl-lactate citrate prepared in 2 stages | 0 | 0 | 0.5 |
| monosodium salt | 0 | 0 | 0 |
| octadecyl lactate | emulsion breaks at the end of stirring | | |
| Dioctadecyl citrate | | | |

The last two lines of the table refer to tests which show that (under the conditions of the test) octadecyl lactate and dioctadecyl citrate do not make it possible to produce stable emulsions of fatty materials in water.

We claim:

1. A citric acid ester of the formula:

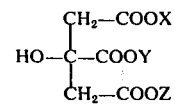

in which each of X, Y and Z represents:
a. hydrogen, alkali metal, or ammonium; or
b. a radical of formula:

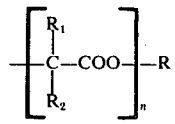

in which $n$ is 1 to 2, $R_1$ and $R_2$, which may be identical or different, are each hydrogen or methyl, and R is a saturated or unsaturated aliphatic radical of 12 to 22 carbon atoms, one to two of X, Y and Z conforming to definition (a), and the remainder conforming to definition (b).

2. An ester according to claim 1 in which one of $R_1$ and $R_2$ is methyl and the other is hydrogen.

3. An ester according to claim 1 in which R is hexadecyl or octadecyl.

4. An ester according to claim 1 selected from the class consisting of hexadecyl lactate citrate and its alkali metal and ammonium salts.

5. An ester according to claim 1 selected from the class consisting of bis(hexadecyl lactate) citrate and its alkali metal and ammonium salts.

6. An ester according to claim 1 selected from the class consisting of octadecyl lactate citrate and its alkali metal and ammonium salts.

7. An ester according to claim 1 selected from the class consisting of bis(octadecyl lactate) citrate and its alkali metal and ammonium salts.

8. An ester according to claim 1 selected from the class consisting of hexadecyl lactyl-lactate citrate and its alkali metal and ammonium salts.

9. An ester according to claim 1 selected from the class consisting of bis(hexadecyl lactyl-lactate) citrate and its alkali metal and ammonium salts.

10. An ester according to claim 1 selected from the class consisting of octadecyl lactyl-lactate citrate and its alkali metal and ammonium salts.

11. An ester according to claim 1 selected from the class consisting of bis(octadecyl lactyl-lactate) citrate and its alkali metal and ammonium salts.

* * * * *